(12) United States Patent
Hovis et al.

(10) Patent No.: US 10,210,617 B2
(45) Date of Patent: Feb. 19, 2019

(54) METHOD AND SYSTEM FOR GENERATING A PERCEPTION SCENE GRAPH HAVING A FOCUS REGION FOR A MOTOR VEHICLE

(71) Applicant: Dura Operating, LLC, Auburn Hills, MI (US)

(72) Inventors: Jeffrey Gene Hovis, Almont, MI (US); Michael Bernhard Szczerba, Troy, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 81 days.

(21) Appl. No.: 15/607,067

(22) Filed: May 26, 2017

(65) Prior Publication Data
US 2018/0342065 A1    Nov. 29, 2018

(51) Int. Cl.
| | |
|---|---|
| *G06T 7/11* | (2017.01) |
| *G06T 7/162* | (2017.01) |
| *G06F 17/30* | (2006.01) |
| *G05D 1/00* | (2006.01) |

(52) U.S. Cl.
CPC ........... *G06T 7/162* (2017.01); *G05D 1/0088* (2013.01); *G06F 17/30256* (2013.01); *G06T 7/11* (2017.01)

(58) Field of Classification Search
None
See application file for complete search history.

(56) References Cited

U.S. PATENT DOCUMENTS

| | | | |
|---|---|---|---|
| 2018/0203446 A1* | 7/2018 | Wyffels | G05D 1/0088 |
| 2018/0260417 A1* | 9/2018 | Mahadevan | G06F 17/30268 |

OTHER PUBLICATIONS

Justin Johnson, Ranjay Krishna, Michael Stark, Li-Jia Li, David A. Shamma, Michael S. Bernstein, Li Fei-Fei, Image Retrieval using Scene Graphs, Stanford University, Max Planck Institute for Informatics, Yahoo Labs, Snapchat.

* cited by examiner

*Primary Examiner* — Richard M Camby
(74) *Attorney, Agent, or Firm* — Robert E. Ford; Raymond J. Vivacqua; Steven L. Crane (57) ABSTRACT

A method and system is provided for generating a perception scene graph (PSG) having a focus region for a motor vehicle. Information is collected about a volume of space including surrounding areas adjacent a motor vehicle by a plurality of external sensors. The information is processed by a perception controller to generate the PSG having a virtual three-dimensional (3-D) model of the volume of space and area adjacent the motor vehicle. The perception controller is configured to allocate variable processing power to process selected portions of the collected sensor information. At least one focus region is defined. A focus region is a sub-set of the volume of space and/or area adjacent the motor vehicle. Processing power is increased by the perception controller to process the portions of the collected information relating to the focus region such that a high fidelity 3-D model of the focus region is generated.

20 Claims, 6 Drawing Sheets

METHOD AND SYSTEM FOR GENERATING A PERCEPTION SCENE GRAPH HAVING A FOCUS REGION FOR A MOTOR VEHICLE

FIELD

The invention relates generally to perception systems for a motor vehicle; more particularly, to a method and system for a perception system for focusing in on regions of interest.

BACKGROUND

The statements in this section merely provide background information related to the present disclosure and may or may not constitute prior art.

Advanced Driver Assistance Systems (ADAS) are used in motor vehicles to enhance or automate selective motor vehicle systems in order to increase occupant safety and operator driving performance. ADAS include vehicle controllers that are in communication with external sensors, vehicle state sensors, and selective motor vehicle systems, such as occupant safety systems and vehicle control systems. The vehicle controllers analyze information gathered by the external sensors and vehicle state sensors to provide instructions to the vehicle control systems to assist the vehicle in avoiding and navigating around obstacles as the vehicle travels down a road.

Typical vehicle controllers include processors and non-transitive memories. The non-transitive memories contained predefined routines executable by the processors and databases accessible by the processors. The processors analyze the information supplied by the external sensors to detect and isolate objects from the background scene. The processors classify the objects by comparing the objects to reference objects stored in the databases. Once the objects are isolated and identified, the distance and direction of the objects relative to the motor vehicle are determined. The vehicle controllers then communicate instructions to the motor vehicle systems, including steering, throttle, and braking control systems, to negotiate a path to avoid contact with the objects or activate safety systems if contact with an object is imminent.

Thus, while current ADAS having vehicle controllers adequate to process information from predetermined specific types of exterior sensors to achieve their intended purpose, there is a need for a new and improved system and method for a perception system that is capable of obtaining higher fidelity for areas of interest while conserving processing power for the overall perception system.

SUMMARY

According to several aspects, a method of using perception information is disclosed. The method includes the steps of collecting sensor information, by at least one external sensor, about a volume of space adjacent a motor vehicle; and processing the sensor information, by a perception controller, to generate a perception scene graph (PSG) having a virtual three-dimensional (3-D) model of the volume of space adjacent the motor vehicle. The perception controller is configured to allocate variable processing power to process selected portions of the collected sensor information. The method also includes defining a first focus region and increasing processing power, by the perception controller, to process a selected first portion of the collected sensor information relating to the first focus region such that a high fidelity 3-D model of the first focus region is generated. The first focus region is a first sub-set of the volume of space adjacent the motor vehicle.

In an additional aspect of the present disclosure, the method further includes the steps of defining a second focus region in the 3-D model, wherein the second focus region is a second sub-set of the volume of space adjacent the motor vehicle; and increasing processing power, by the perception controller, to process a selected second portion of the collected sensor information relating to the second focus region such that a high fidelity 3-D model of the second focus region is generated.

In another aspect of the present disclosure, the method further includes the steps of decreasing the processing power to the portion of the collected sensor information, by the at least one external sensor, not relating to the first and second focus regions.

In another aspect of the present disclosure, the method further includes the step of assigning a higher priority to one of the first and second focus regions.

In another aspect of the present disclosure, the method further includes the step of further increasing the processing power to process the selected portion of the collected sensor information relating to the first focus region or second focus region corresponding to the assigned higher priority.

In another aspect of the present disclosure, the at least one external sensor includes an effective sensor range. The method further includes the steps of receiving vehicle-to-everything (V2X) information, by a V2X receiver, containing information about an extended volume of space beyond the effective sensor range; and fusing the V2X information, by the perception controller, with the PSG to augment the virtual three-dimensional (3-D) model by extending the volume of space beyond the effective sensor range of the motor vehicle.

In another aspect of the present disclosure, a focus region is defined in the extended volume of space beyond the effective sensor range.

In another aspect of the present disclosure, the method further includes a step of increasing an intensity of collecting sensor information in the first sub-set of the volume of space adjacent the motor vehicle, including increasing a scan rate for the at least one sensor or directing additional external sensors for collecting sensor information in the first sub-set of the volume of space.

According to several aspects, a method of generating a perception scene graph having a focus region for a motor vehicle. The method includes the steps of collecting sensor information, by a plurality of external sensor, about a real-world area adjacent a motor vehicle, processing the sensor information to generate a perception scene (PSG) comprising a three-dimensional (3-D) model of the real-world area adjacent the motor vehicle; extracting information from the PSG to execute a vehicle application routine; defining a focus region in the 3-D model by the vehicle application routine; identifying at least one of the plurality of external sensors having an effective sensor range that covers the corresponding portion of real-world area; and increasing processing power to the identified at least sensor to obtain greater fidelity and confidence of information about the corresponding portion of real-world area. The focus region corresponds to a portion of the real-world area adjacent the motor vehicle.

In an additional aspect of the present disclosure, the method further includes the steps of identifying a group of sensors, wherein each of the sensors within the group include a sensor detection area that partially overlap with the corresponding portion of real-world area; fusing the sensor detection areas of the group of sensors; and generating a high fidelity 3-D model of the focus region in the PSG.

In another aspect of the present disclosure, the method further includes the steps of defining a plurality of focus regions in the 3-D model by the vehicle application routine, wherein the focus regions corresponds to portions of the real-world area adjacent the motor vehicle; identifying a plurality of external sensors having an effective sensor range that extends partially into the corresponding portions of real-world area corresponding to the focus regions; increasing processing power to the identified plurality of external sensors; and decreasing processing power to the non-identified plurality of external sensors.

In another aspect of the present disclosure, the step of processing sensor information to generate the PSG is executed by a perception controller, and wherein the step of extracting information from the PSG to execute a vehicle application routine is executed by a vehicle state decision logic (SDL) controller; and further comprising the step of publishing a copy of the PSG in the perception controller and in the SDL controller.

In another aspect of the present disclosure, the method further includes the steps of receiving a plurality of vehicle-to-everything (V2X) signals, by a V2X receiver, containing a three-dimensional model of the real-world area beyond the plurality of external sensors of the motor vehicle; and fusing the three-dimensional model of the real-world area beyond the plurality of external sensors of the motor vehicle with the three-dimensional model of the real-world area adjacent the motor vehicle.

In another aspect of the present disclosure, the method further includes the steps of defining a remote focus region in the 3-D model by the vehicle application routine, wherein the remote focus region corresponds to a portion of the real-world area beyond the plurality of external sensors of the motor vehicle.

In another aspect of the present disclosure, the method further include the step of receiving V2X signals that contains information in the remote focus region.

According to several aspects, a system having a plurality of external sensors configured to collect information on an adjacent area surrounding a host vehicle is disclosed. The system includes a perception controller configured to process the sensor information to generate a perception scene graph comprising a three-dimensional model of the real-world area adjacent the motor vehicle. The perception controller includes a sensor priority manager. The system also includes a state decision logic (SDL) controller configured to subscribe to the PSG and extracting information from the 3-D model to execute a vehicle application routine. The vehicle application routine include a sub-routine to define a focus region. The priority manager identifies sensors that have an effective sensor range that partially overlaps the focus region and increases processing power to the identified sensors.

In an additional aspect of the present disclosure, the perception controller is configured to fuse the effective sensor ranges to generate a high fidelity 3-D model of the focus region.

In another aspect of the present disclosure, the perception controller is configured to reduce processing power to the plurality of sensor that are not identified to cover the focus regions.

In another aspect of the present disclosure, the system further includes a V2X receiver configured to receive information containing a 3-D model of the real world beyond the sensor readings.

In another aspect of the present disclosure, the SDL controller is configured to publish a copy of the PSG comprising a high fidelity 3-D model of the focus region With Focus Regions, the software applications can direct the perception system to acquire higher definition details about the region of space defined in the focus regions within the PSG. This can enrich the data in this specific region of space in the PSG, thereby allowing clients of the PSG (e.g. decision and control applications) to have access to higher fidelity data.

Other benefits and further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

A perception scene graph (PSG) is a data structure that contains processed information representing a virtual 3-Dimensonal (3-D) model of a volume of space and/or area surrounding the motor vehicle, including any objects within that volume of space and/or area. A PSG can be viewed as a visually-grounded graphical structure of the real-world surrounding the motor vehicle. In the PSG, objects are isolated from the background scene, characterized, and located with respect to the motor vehicle. The movements of the objects may be tracked and recorded. The movements of the objects may also be predicted based on historic locations and trends in the movements.

Figure 1:
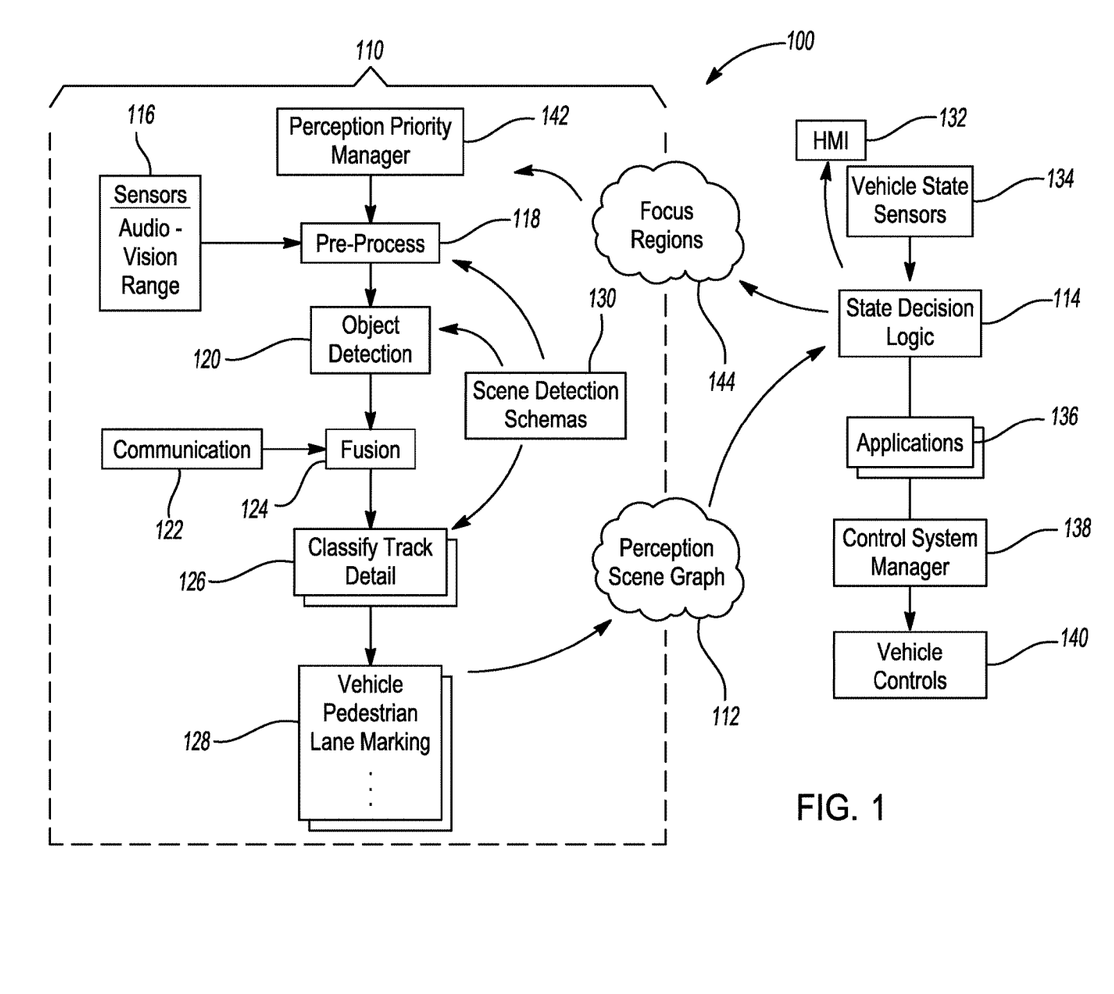
FIG. 1 is a functional diagram of a process for generating and using a perception scene graph (PSG) in a motor vehicle, according to an exemplary embodiment.

FIG. 1 shows a functional diagram 100 of a perception process 110 for generating a perception scene graph (PSG) 112 and the use of the PSG 112 by a motor vehicle having state decision logic (SDL) 114. The perception process 110 publishes the PSG 112 and the vehicle SDL 114 subscribes to and extracts the processed information from the PSG 112. The vehicle SDL 114 uses the extracted information as input for the execution of a variety of vehicle software applications.

The perception process 110 starts in block 116 where the external sensors of the motor vehicle gather information about a volume of space surrounding the motor vehicle, including the adjacent surrounding areas. The gathered raw information is pre-processed in block 118 and objects are isolated and detected in block 120 from the background scene. The distance and direction of each object relative to the motor vehicle are also determined. The information gathered about a volume of space, including the adjacent areas, surrounding the motor vehicle is limited by the audio-visual ranges of the external sensors.

In block 122, incoming communications containing information on additional objects within and/or beyond the audio-visual range of the external sensors are communicated to the motor vehicle via vehicle-to-everything (V2X) communication to supplement the objects detected in block 120. V2X communication is the passing of information from a vehicle to any communication device and vice versa, including, but not limited to, vehicle-to-vehicle (V2V), vehicle-to-infrastructure (V2I), vehicle-to-pedestrian (V2P), vehicle-to-device (V2D), and vehicle-to-grid (V2G) communications. In block 124, the information gathered by the external sensors from block 116 and information communicated to the motor vehicle from block 122 are fused to increase the confidence factors of the objects detected together with the range and direction of the objects relative to the motor vehicle.

In blocks 126 and 128, once the various information are fused, the detected objects are compared with reference objects in a database to identify the classification of the objects. The types of classification include, but are not limited to, types of lane markings, traffic signs, infrastructure, vehicles, pedestrians, animals, and any other animate or inanimate objects that may be found in a typical roadway. Once the objects are classified, the movements of the objects are tracked and predicted based on historic locations and trends in movement of the objects.

The perception process 110 is partially controlled by a scene detection schema (SDS) at block 130. The SDS describes what objects in block 120 and classifications in block 126 to search for at a particular point in time. In block 142, a perception priority manager has the responsibility to control and manage which tasks to perform in the perception pre-processing of block 118. For example, the perception priority manager may allocate greater processing power to the sensors directed rearward of the vehicle as the vehicle is moving rearward into a parking space.

The PSG 112 is generated containing information on a set of localized objects, categories of each object, and relationship between each object and the motor vehicle. The PSG 112 is continuously updated by the information gathered by the external sensors in block 116 and communications received by V2X communications in block 122 to reflect the real time change of the adjacent and non-adjacent volume of space and areas surrounding the motor vehicle. The historical events of the PSG 112 may be recorded in the perception controller's memory to be retrieve at a later time.

In block 114, the vehicle SDL, which may be part of the motor vehicle ADAS, subscribes to the PSG 112 to extract information pertaining to the external surrounding volume of space and areas of the motor vehicle. The vehicle SDL 114 can process the information contained in the PSG 112 to render and display on a human machine interface (HMI) 132, such as a display monitor on the dash of the motor vehicle, a virtual three-dimensional landscape representing the real-world environment surrounding the motor vehicle.

The vehicle SDL 114 can also analyze the information extracted from the PSG 112 to manage the current state of the vehicle control system managers 138 and to control the transitions of the control system managers 138 to new states.

The vehicle SDL 114 receives information from the vehicle state sensors of block 134 to determine the state of the motor vehicle such as location, velocity, acceleration, yaw, pitch, etc. With information from the PSG 112 and vehicle state sensor information from block 134, the vehicle SDL 114 can execute routines contained in software applications in block 136 to send instructions to the motor vehicle control system manager 138 to operate the vehicle controls 140.

As the vehicle SDL 114 executes routines contained in software applications 136, the software applications 136 may require greater fidelity or information relating to regions of interest, or focus regions 144. This would be similar to the action taken by a vehicle driver of turning their head to see if a vehicle is present before they perform a lane change. A focus region 144 defines an area or volume of space that is important to the software applications of block 136 during a particular time span. The required focus region 144 is communicated to the perception priority manger in block 142, which in turn the priority manager allocates greater processing power to the sensors directed to the required focus region 144 and allocate greater processing power to the sensors directed.

Figure 2:
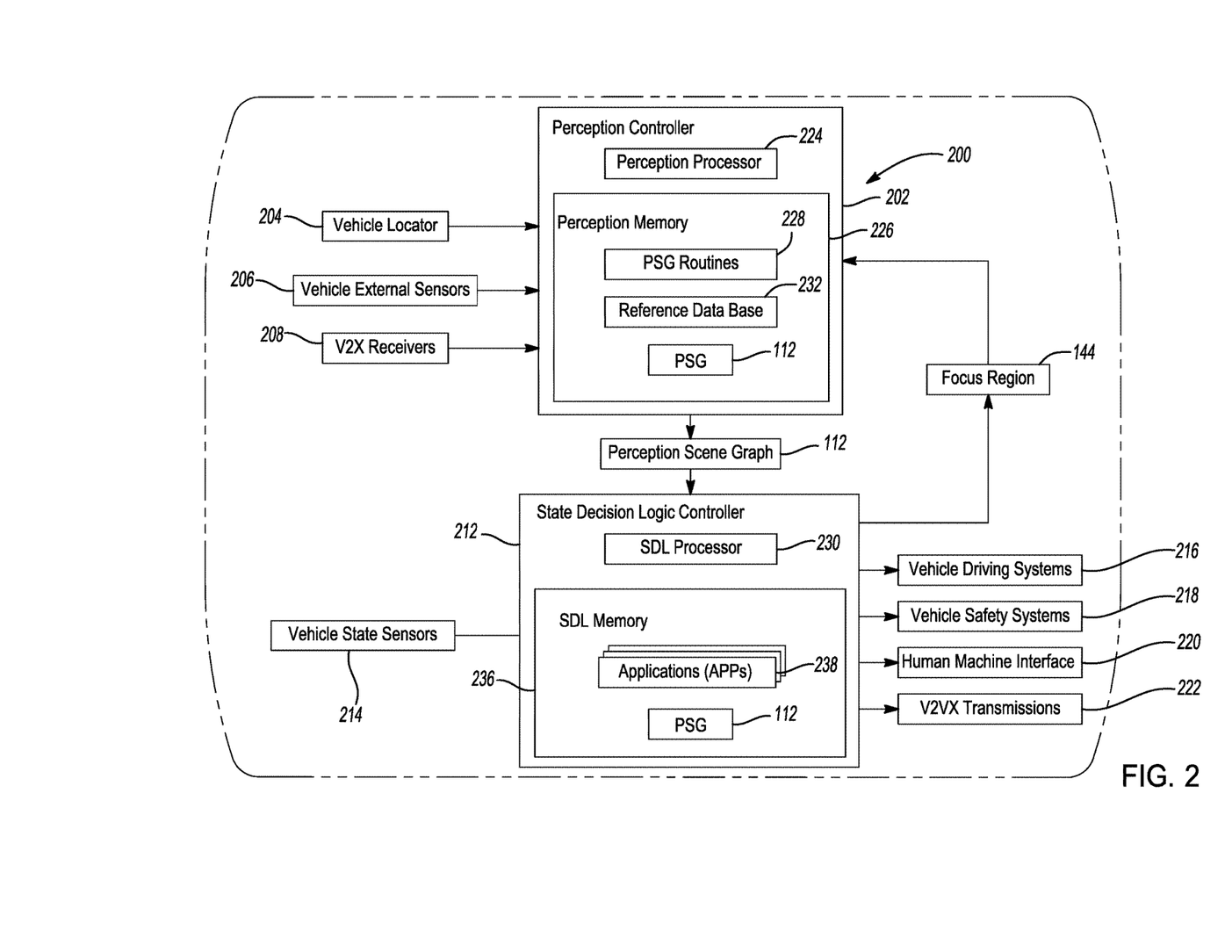
FIG. 2 is a functional diagram of a perception system and a vehicle state decision logic (SDL) controller, according to an exemplary embodiment.

FIG. 2 shows a functional diagram of a perception system 200 having a perception controller 202 configured to receive information from a vehicle locator 204, a plurality of external sensors 206, and V2X receivers 208. FIG. 2 also shows a functional diagram of a SDL controller 212 configured to receive vehicle state information from a plurality of vehicle state sensors 214. The SDL controller 212 is configured to be in communication with the vehicle driving systems 216, vehicle safety systems 218, vehicle HMI 220, and vehicle V2X transmitters 222.

The perception controller 202 includes a perception processor 224 and a perception memory 226. The perception processor 224 processes the information gathered from the vehicle locator 204, external sensors 206, and V2X receivers, and executes PSG routines 228 stored in the perception memory 226 to generate the PSG 112 in real time as the motor vehicle is stationary or traveling along a roadway. A real time copy of the PSG 112 is published in the perception memory 226 for availability to various systems that require information pertaining to the surroundings of the vehicle. The perception memory 226 also includes a reference data base 232 containing reference objects that are used to compare with the detected objects for classifying the detected objects. The reference database 232 includes the geometry and classifications of each of the reference objects.

The external sensors 206 are sensors that can detect physical objects and scenes surrounding the motor vehicle. The external sensors 206 include, but are not limited to, radar, laser, scanning laser, camera, sonar, ultra-sonic devices, LIDAR, and the like. The external sensors 206 may be mounted on the exterior of the vehicle such as a rotating laser scanner mounted on the roof of the vehicle or mounted within the interior of the vehicle such as a front camera mounted behind the windshield. Certain of these external sensors 206 are configured to measure the distance and direction of the detected objects relative to the location and orientation of the motor vehicle. Raw information acquired by these external sensors 206 are processes by the perception controller 202 to determine the classification, size, density, and/or color of the detected objects. The external sensors 206 are configured to continuously update their outputs to the perception controller 202 to reflect the real-time changes in the volume of space and areas surrounding the motor vehicle as information is being collected.

The vehicle SDL controller 212 includes a SDL processor 234 and a SDL memory 236. The SDL controller 212 receives information from the vehicle state sensors 214 and is in communication with various vehicle systems and components such as the driving system 216, safety system 218, HMI 220, and V2X transmitters 222. The SDL processor 230 processes information gathered by the vehicle state sensors 214 and subscribes to the PSG 112 to execute software applications stored in the SDL memory 236 to issue instructions to one or more of the vehicle systems 216, 218, 220, 222. The routines include various vehicle software applications 238, also known as vehicle APPS 238, including routines for the operations of the vehicle driving and safety systems 216, 218. For example, the vehicle SDL controller 212 may be in communication with the vehicle driving system 216 that controls the vehicle's deceleration, acceleration, steering, signaling, navigation, and positioning. The SDL memory 236 may also include software applications to render the information stored in the PSG 112 to be displayed on a HMI device 220 such as a display monitor on the dash of the vehicle. The SDL memory 236 may also include software applications 238 that requires greater fidelity information in area or volume of space, also known as a focus region 144 that is important to the software applications 238 during a particular time span. The required focus region 144 is communicated to the perception controller 202 by the SDL controller 212. The perception controller 202 allocates greater processing power to process information collected by the external sensors 206 directed to the required focus region 144.

The perception and SDL processors 224, 230 may be any conventional processor, such as commercially available CPUs, a dedicated ASIC, or other hardware-based processor. The perception and SDL memories 226, 236 may be any computing device readable medium such as hard-drives, solid state memory, ROM, RAM, DVD or any other medium that is capable of storing information that is accessible to the perception processor. Although only one perception controller 202 and only one SDL controller 212 are shown, it is understood that the vehicle may contain multiple perception controllers 202 and multiple SDL controllers 212.

Each of the perception and SDL controllers 202, 212 may include more than one processor and memory, and the plurality of processors and memories do not necessary have to be housed within the respective controllers 202, 212. Accordingly, references to a perception controller 202, perception processor, and perception memories 226 include references to a collection of such perception controllers 202, perception processors, and perception memories that may or may not operate in parallel. Similarly, references to a SDL controller 212, SDL processor 230, and SDL memories 236 include references to a collection of SDL controllers 212, SDL processors 230, and SDL memories 236 that may or may not operate in parallel.

The information contained in the PSG 112 is normalized to the motor vehicle to abstract out the vehicle locator 204, external sensors 206, and V2X receivers 208 as the sources of the information. In other words, the SDL controller 212 is isolated from the raw information that the perception controller 202 receives from the vehicle locator 204, external sensors 206, and V2X receivers 208. With respect to the external surroundings of the motor vehicle, the SDL controller 212 extracts the processed information stored in the PSG 112 as input to execute software applications 238 for the operation of the motor vehicle. The SDL controller 212 does not see the real-world surroundings of the motor vehicle, but only see the virtual 3D model of the real-word surrounding generated by the perception controller 202. A primary benefit to this is that the external sensors 206 and types of external sensors 206 may be substituted without the need to replace the SDL processors 230 and/or upgrade the software applications contained in the SDL memories 236 to accommodate for the different external sensor types. A real-time copy of the PSG 112 may be published to the SDL controller 212 and to various other system controllers and/or computing devices throughout the motor vehicle. This ensures that if one or more of the perception controllers 202 and/or SDL controller 212 should fail, the various other system controllers and/or computing devices will be able to operate temporary in a "limp-home" mode to navigate the motor vehicle into a safe zone or area.

Figure 3:
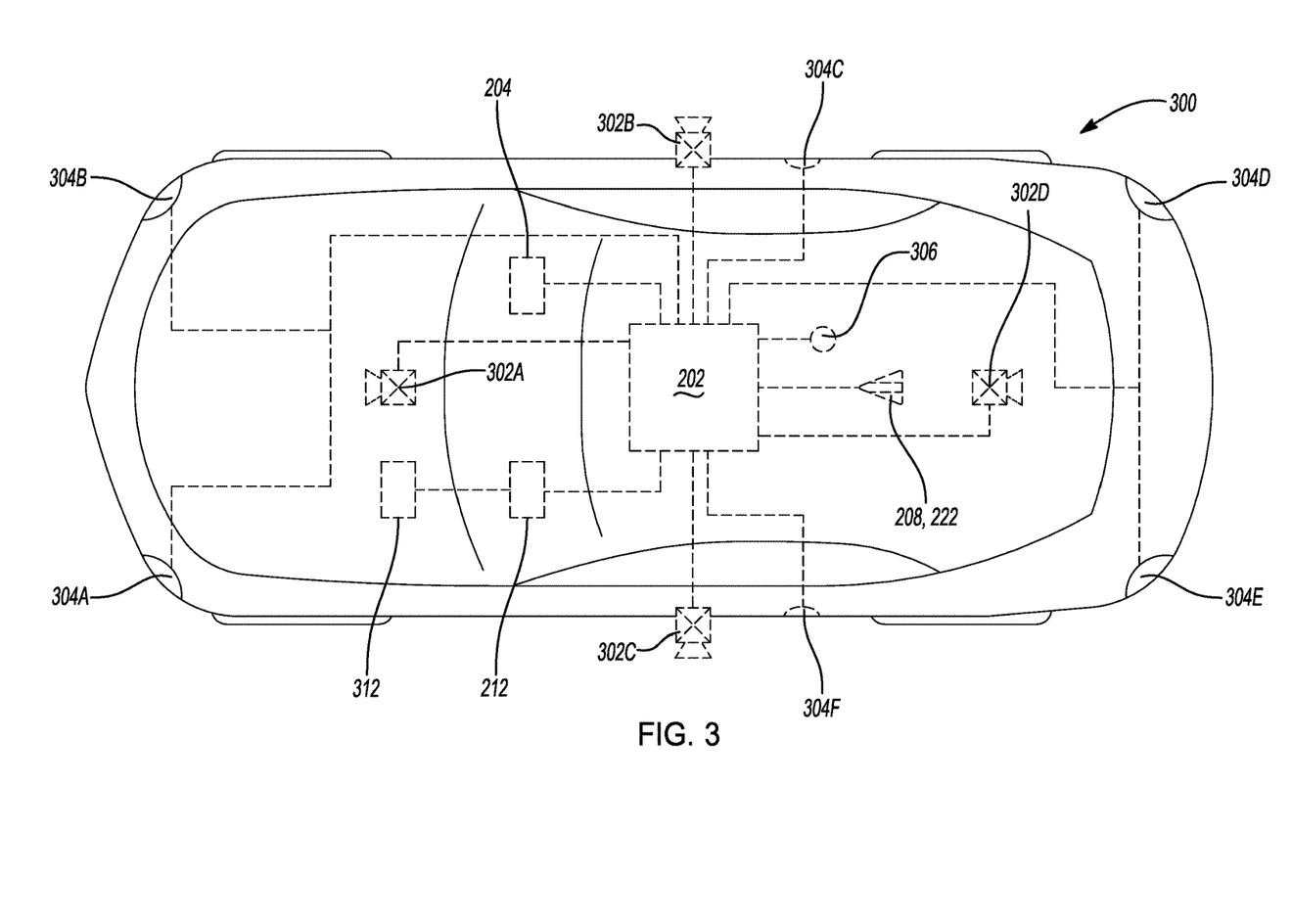
FIG. 3 is a vehicle having the perception system and the vehicle SDL controller of FIG. 2, according to an exemplary embodiment.

FIG. 3 shows an exemplary land based motor vehicle 300 equipped with the perception system 200 and SDL controller 212 of FIG. 2. For illustrative purposes, a passenger type motor vehicle is shown; however, the vehicle may be that of a truck, sport utility vehicle, van, motor home, or any other type of land based vehicle. It should be appreciated that the motor vehicle may also be that of a water based vehicle such as a motor boat or an air base vehicle such as an airplane without departing from the scope of the present disclosure.

The motor vehicle 300 includes a plurality of cameras 302 configured to capture images of the areas surrounding the motor vehicle 300. The exemplary motor vehicle 300 includes a front camera 302A, a right-side camera 302B, a left-side camera 302C, and a rear camera 302D. Each of the aforementioned cameras 302A-302D is configured to capture visual information in the visible light spectrum and/or in a non-visual (e.g. infrared) portion of the light spectrum in the field of view, or visual area of coverage, of the respective camera.

The motor vehicle 300 also includes a plurality of ranging sensors 304 distributed about the periphery of the motor vehicle and are configured to detect objects in the immediate vicinity adjacent the motor vehicle. FIG. 3 shows ranging sensors 304A-304F mounted on the periphery of the motor vehicle 300. Each of the ranging sensors 304A-304F may include any ranging technology, including radar, LiDAR, sonar, etc., capable of detecting a distance and direction between an object, such as a pedestrian, and the motor vehicle. The motor vehicle 300 may also include a scanning laser 306 mounted on top of the vehicle configured to scan the volume of space about the vehicle to detect the presence, direction, and distance of objects with that volume of space.

Each of the different types of external sensors 302, 304, 306 have their own unique sensing characteristics and effective ranges. The sensors 302, 304, 306 are placed at selected locations on the vehicle and collaborate to collect information on areas surrounding the motor vehicle. The sensor information on areas surrounding the motor vehicle may be obtained by a single sensor, such the scanning laser, capable of scanning a volume of space about the motor vehicle or obtained by a combination of a plurality of sensors. The raw data from the sensors 302, 304, 306 are communicated to a pre-processor or directly to the perception controller 202 for processing. The perception controller 202 is in communication with the vehicle SDL controller 212, which is in communications with a various vehicle control systems.

The motor vehicle 300 may include a V2X receiver 208 and V2X transmitter 222. The V2X receiver 208 and V2X transmitter 222 may include a circuit configured to use Wi-Fi and/or Dedicated Short Range Communications (DSRC) protocol for communication other vehicles equipped with V2V communications and to roadside units equipped with V21 communications to receive information such as lane closures, construction-related lane shifts, debris in the roadway, and stalled vehicle. The V2X receiver 208 and transmitters 222 enable the motor vehicle 300 to subscribe to other PSGs generated by other similar equipped vehicles and/or roadside units. The V2X receiver 208 and transmitters 222 also enable the motor vehicle 300 to publish the PSG 112 generated by the perception controller 202. Similarly equipped vehicles within range of the V2X transmitter 222 may subscribe to the published PSG 112. A PSG 112 covering an area greater than the effective ranges of the sensors 302, 304, 306 may be generated by fusing the information from multiple PSGs received from other similar equipped vehicles and/or roadside units capable of generating their own PSGs or transmitting of raw data for the perception controller 202 to process.

The motor vehicle includes a vehicle locator 204, such as a GPS receiver, configured to receive a plurality of GPS signals from GPS satellites to determine the longitude and latitude of the motor vehicle as well as the speed of the motor vehicle and the direction of travel of the motor vehicle. The location, speed, and direction of travel of the motor vehicle may be displayed on a preloaded electronic map and fused with the PSG 112.

Figure 4:
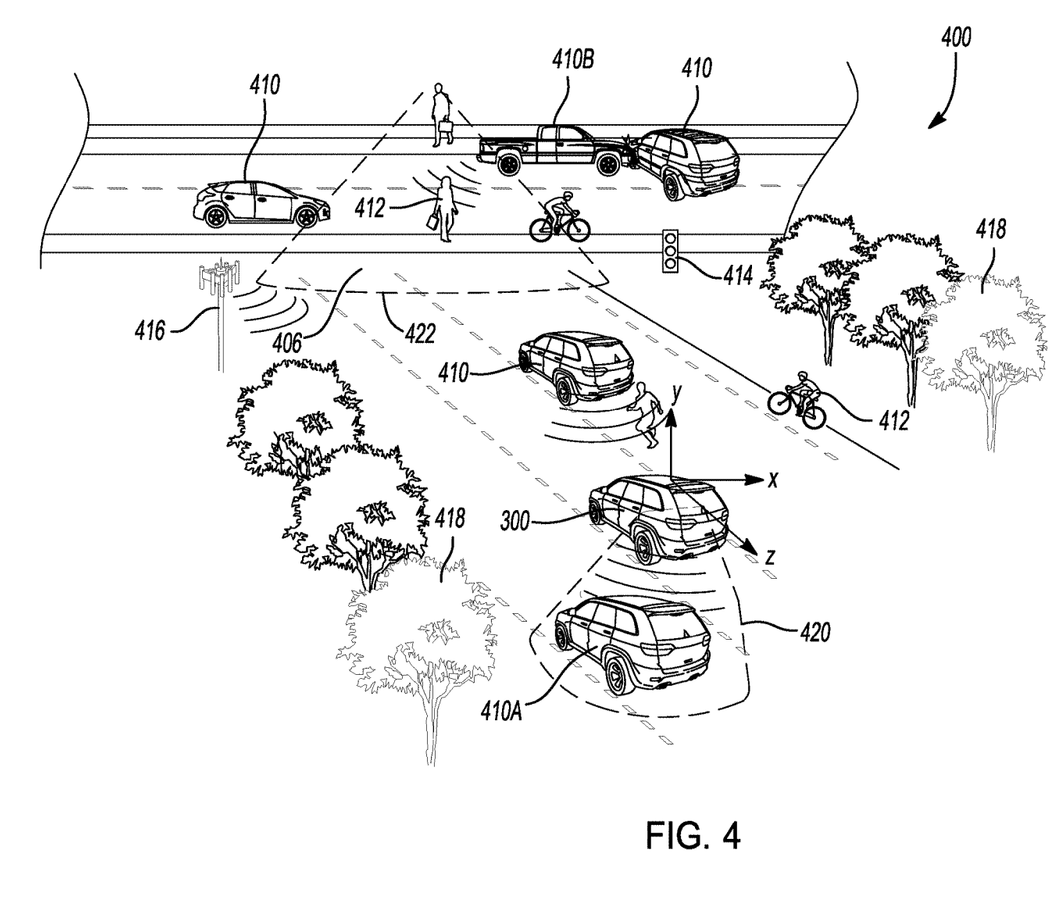
FIG. 4 is a rendering of the information contained in the PSG published by the perception system of FIG. 2, according to an exemplary embodiment.

Shown in FIG. 4 is an exemplary illustration 400 of a rendering, also known as image synthesis, of an image of a virtual scene from the information contained in the PSG 112. The illustration 400 is a virtual three-dimensional (3-D) model of the real-world environment surrounding a host motor vehicle 300 including roads 404, intersections 406, and connections between these features. The illustration 400 presents a 3-D view of the objects and surfaces organized about the host motor vehicle 300. The scene also includes manmade objects such as adjacent vehicles 410, pedestrians 412, road signs 414, roadside unit infrastructure 416 such as communication towers 416, and natural objects such as trees 418 and roadside shrubbery 418 arranged in a spatial layout in the x, y, and z directions with respect to the host motor vehicle 300. The rendered objects may include additional details such as texture, lighting, shading, and color. The illustration 400 of the virtual scene is continuously updated in real time as new information is published to the PSG 112 as the host motor vehicle 300 travels down the roadway.

The virtual scene may contain detailed characteristics of the detected objects. For example, the detailed characteristics may include whether an adjacent vehicle 410 is facing toward or away from the host motor vehicle 300, the make and model of the adjacent vehicle 410, and the license plate number of the adjacent vehicle 410. The information to determine these detailed characteristics are collected and processed during the normal operation of the motor vehicle 300. The information is processed by a scene detection schema to determine the detailed characteristics.

The virtual 3-D model of the real-world environment surroundings contain detailed information beyond what can be gathered by the limited ranges of the motor vehicle external sensors 206. The information provided by the motor vehicle external sensors 206 is augmented by additional information supplied to the host motor vehicle 300 by similarly equipped adjacent vehicles 410 and infrastructure roadside units 416 via V2X communications.

The vehicle 300 is illustrated with an exemplary focus region 420 defined adjacent to the left-rear quarter of the vehicle 300. The vehicle SDL 114 executes routines contained in software applications that may require greater fidelity or information relating to regions of interest, or focus regions 144, in the PSG 112. The software routines may be activated by, but not limited to, inputs by the human driver such as activating a turn signal. In this example, the software routine would focus in on the region of interest as the area adjacent the left-rear quarter of the vehicle for the detection of objects, such as adjacent vehicle 410A, in the vehicle's blind spot. This would be similar to the action taken by a human driver of turning his/her head to see if a vehicle is present before the human driver performs a lane change. It should be appreciated that the focus regions do not necessary have to be adjacent to the vehicle. The focus regions may be remote from the vehicle 300, in which the focus regions are generated from information collected from the V2X receivers from remote vehicles 410 and/or roadside units 416.

A focus region is defined in the virtual 3-D world of the PSG 112 by the vehicle software applications. The focus region may correspond to a portion of the real-world area adjacent the motor vehicle. The priority manager identifies the external sensors having an effective sensor range that covers the corresponding portion of real-world area and increases processing power to the identified externals sensors to obtain greater fidelity and confidence of information about that corresponding portion of real-world area. The information collected from overlapping or partially overlapping sensors are fused to generate a high fidelity 3-D model of the focus region in the PSG. To account for the increase in processing power, the processing power to the external sensors not contributing to the focus region are decreased. As indicated above, a focus region 422 may also be remote from the vehicle 300. For example, FIG. 4 shows a remote focus region 422 covering an upcoming intersection 406. In this example, the remote focus region 422 is generated from information collected from a roadside unit 416 and from a remote vehicle 410b adjacent the intersection 406.

Figure 5:
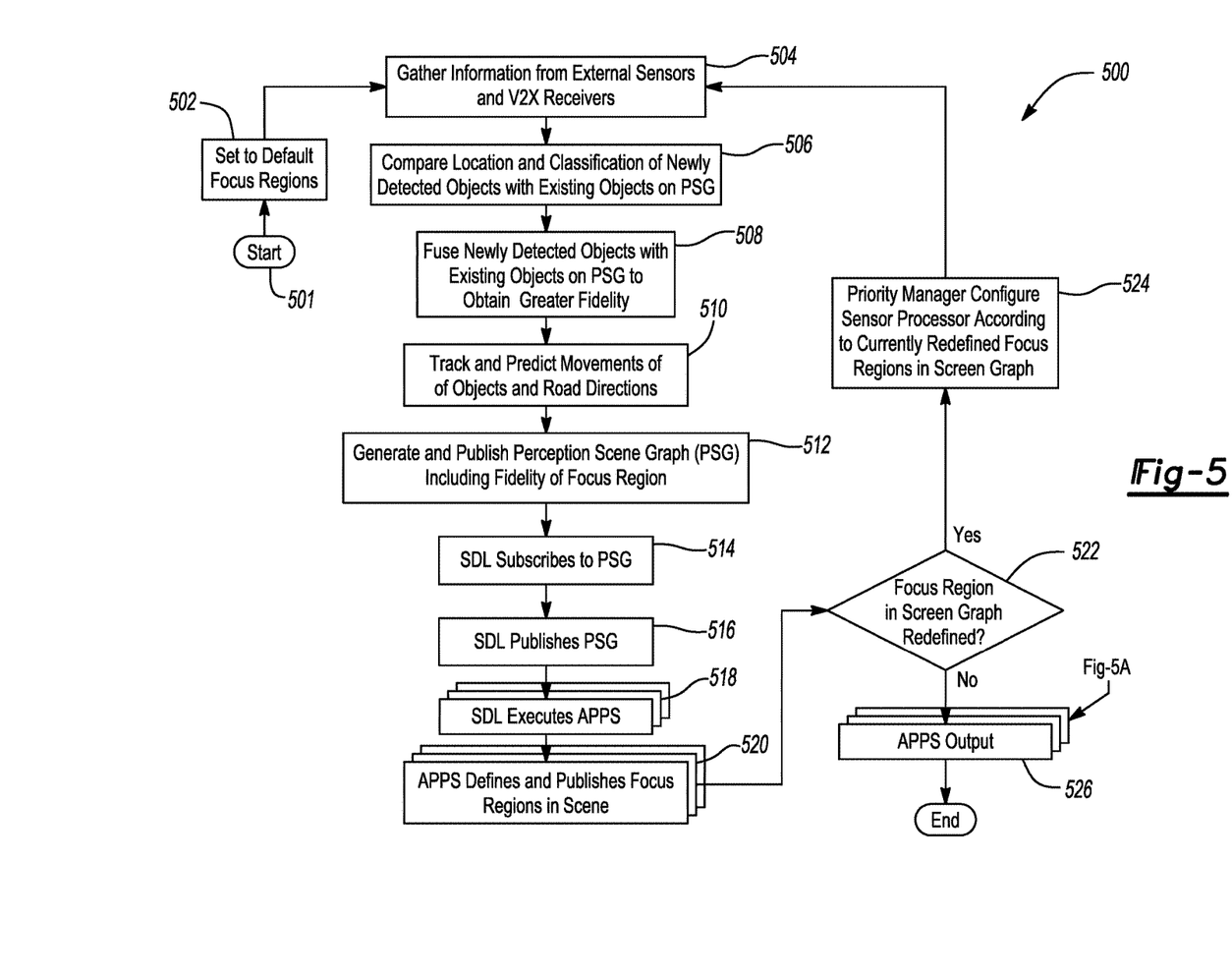
FIG. 5 is a flow diagram showing a method of generating a PSG having at least one focus region.

FIG. 5 shows a flowchart of a method 500 for generating a PSG 112 having at least one focus region during normal vehicle operations, in accordance with an embodiment. The method starts in step 501. In step 502, upon start-up of the motor vehicle or when the motor vehicle is shifted out of park, the perception controller 202 is initialized with default focus regions, such as the area directly in front and/or rear of the motor vehicle. In step 504, the external sensors 206 gather information on the surroundings of the motor vehicle and communicate the information to the perception controller 202. Additional information regarding the surroundings of the motor vehicle 300, including information that is outside the range of the external sensors 206, are communicated to the perception controller 202 by the V2X receivers 208.

In step 506, the information on objects gathered by the plurality of external sensors 206 and information received by the V2X receivers 208 are detected, isolated, and compared with reference objects in a database 232 to identify the classification of the objects. In this step 506, information gathered by the external sensors 206 and information received by the V2X receivers 208 may be fused to increase the confidence factors of the objects detected together with the range and direction of the objects relative to the motor vehicle 300. The newly detected objects are compared with existing objects in the PSG 112 that were previously detected.

In step 508, if the newly detected objects and previously detected objects are determined to be the same, then the newly detected objects are fused with the previously detected objects to obtain greater fidelity of the object. Greater fidelity, also known as higher fidelity, includes increased details on the object's classification and location with respect to the motor vehicle.

In step 510, once the newly detected objects and previously detected objects are fused, the movements of the objects are tracked and predicted based on historic locations and trends in movement of the objects.

In step 512, the PSG 112 is generated, published, and becomes accessible by various vehicle systems that require information about the surroundings of the motor vehicle. The PSG 112 contains information on a set of localized objects, categories of each object, and relationship between each object and the motor vehicle 300. The PSG 112 is continuously updated and historical events of the PSG 112 may be recorded.

In step 514, a SDL controller 212 subscribes to the published PSG 112. In step 516, the SDL controller 212 publishes a real-time copy of the PSG 112 that may be subscribed to by various other vehicle systems. The various vehicle systems may utilize the published PSG 112 stored in the SDL controller 212 to operate in a temporary "limp-home" mode if the external sensors 206 or perception controller 202 malfunctions.

In step 518, the SDL controller 212 extracts the information stored in the PSG 112 as input to execute software applications 238 for the operation of the various motor vehicle systems. In step 520, the software applications 238 may redefine and publish the redefined focus regions in the PSG 112.

In step 522, if the software applications' redefined focus regions are different from the previously defined focus regions, such as the default focus regions, then in step 524, the priority manager reconfigures sensor preprocessing according to the currently redefined focus regions in the PSG 112 and the process starts again from step 504. If the software applications redefined focus regions are the same as the previously defined focus regions (i.e. not redefined), then the output 526 of the software applications 238, or APPS Output 526, are transmitted to the various vehicle systems.

Figure 5A:
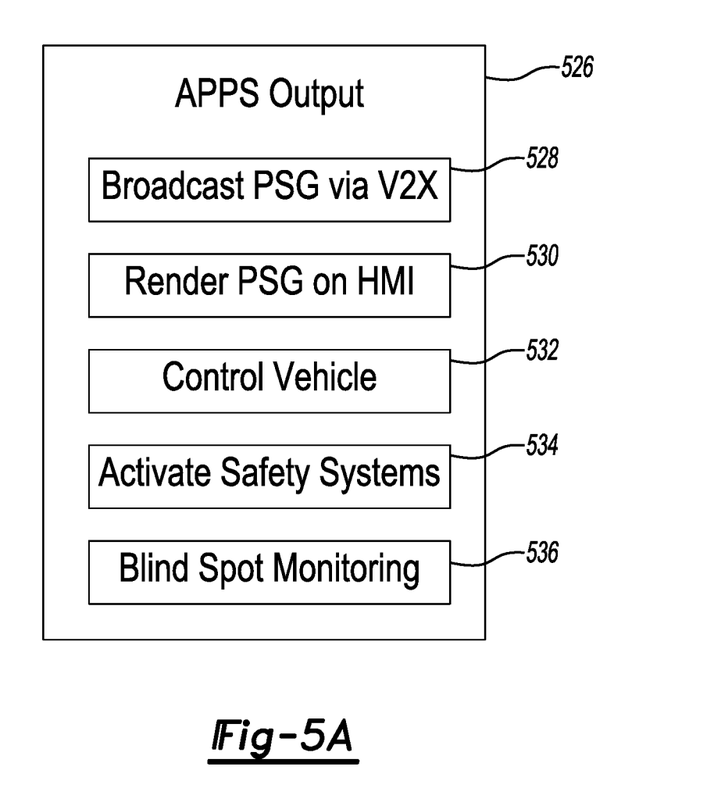
FIG. 5A shows examples of various software applications that may utilize the information stored in the PSG.

FIG. 5A shows examples of various software applications that may utilize the information stored in the PSG 112 extracted by the SDL controller 212. The various software applications include APPS for communicating by V2X to other vehicles or roadside units 528, rendering a 3-D PSG on a HMI 530, controlling the vehicle drive systems 532, activating systems 534, and blind spot monitoring 536, amongst many other APPS.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

What is claimed is:

1. A method of using perception information, comprising the steps of:
    collecting sensor information, by at least one external sensor, about a volume of space adjacent a motor vehicle;
    processing the sensor information, by a perception controller, to generate a perception scene graph (PSG) comprising a virtual three-dimensional (3-D) model of the volume of space adjacent the motor vehicle, wherein the perception controller is configured to allocate variable processing power to process selected portions of the collected sensor information;
    defining a first focus region, wherein the first focus region is a first sub-set of the volume of space adjacent the motor vehicle; and
    increasing processing power, by the perception controller, to process a selected first portion of the collected sensor information relating to the first focus region such that a high fidelity 3-D model of the first focus region is generated.

2. The method of claim 1, further comprising the steps of:
    defining a second focus region in the 3-D model, wherein the second focus region is a second sub-set of the volume of space adjacent the motor vehicle; and
    increasing processing power, by the perception controller, to process a selected second portion of the collected sensor information relating to the second focus region such that a high fidelity 3-D model of the second focus region is generated.

3. The method of claim 2, further comprising the steps of decreasing the processing power to the portion of the collected sensor information, by the at least one external sensor, not relating to the first and second focus regions.

4. The method of claim 3, further comprising the step of assigning a higher priority to one of the first and second focus regions.

5. The method of claim 4, further comprising the step of further increasing the processing power to process the selected portion of the collected sensor information relating to the first focus region or second focus region corresponding to the assigned higher priority.

6. The method of claim 1, wherein the at least one external sensor includes an effective sensor range, and further comprising the steps of:
    receiving vehicle-to-everything (V2X) information, by a V2X receiver, containing information about an extended volume of space beyond the effective sensor range; and
    fusing the V2X information, by the perception controller, with the PSG to augment the virtual three-dimensional (3-D) model by extending the volume of space beyond the effective sensor range of the motor vehicle.

7. The method of claim 6, wherein a focus region is defined in the extended volume of space beyond the effective sensor range.

8. The method of claim 7, further including a step of increasing an intensity of collecting sensor information in the first sub-set of the volume of space adjacent the motor vehicle, including increasing a scan rate for the at least one sensor or directing additional external sensors for collecting sensor information in the first sub-set of the volume of space.

9. A method of generating a perception scene graph having a focus region for a motor vehicle, comprising the steps of:
    collecting sensor information, by a plurality of external sensor, about a real-world area adjacent a motor vehicle;
    processing the sensor information to generate a perception scene (PSG) comprising a three-dimensional (3-D) model of the real-world area adjacent the motor vehicle;
    extracting information from the PSG to execute a vehicle application routine;

defining a focus region in the 3-D model by the vehicle application routine, wherein the focus region corresponds to a portion of the real-world area adjacent the motor vehicle;

identifying at least one of the plurality of external sensors having an effective sensor range that covers the corresponding portion of real-world area; and increasing processing power to the identified at least sensor to obtain greater fidelity and confidence of information about the corresponding portion of real-world area.

10. The method of claim 9, further comprising the steps of:

identifying a group of sensors, wherein each of the sensors within the group include a sensor detection area that partially overlap with the corresponding portion of real-world area;

fusing the sensor detection areas of the group of sensors; and generating a high fidelity 3-D model of the focus region in the PSG.

11. The method of claim 10, further comprising the steps of:

defining a plurality of focus regions in the 3-D model by the vehicle application routine, wherein the focus regions corresponds to portions of the real-world area adjacent the motor vehicle;

identifying a plurality of external sensors having an effective sensor range that extends partially into the corresponding portions of real-world area corresponding to the focus regions;

increasing processing power to the identified plurality of external sensors; and decreasing processing power to a plurality of external sensors that were not identified as having an effective sensor range that extends partially into the corresponding portions of real-world area corresponding to the focus regions.

12. The method of claim 11, wherein the step of processing sensor information to generate the PSG is executed by a perception controller, and wherein the step of extracting information from the PSG to execute a vehicle application routine is executed by a vehicle state decision logic (SDL) controller; and further comprising the step of publishing a copy of the PSG in the perception controller and in the SDL controller.

13. The method of claim 10, further comprising the steps of:

receiving a plurality of vehicle-to-everything (V2X) signals, by a V2X receiver, containing a three-dimensional model of the real-world area beyond the plurality of external sensors of the motor vehicle; and fusing the three-dimensional model of the real-world area beyond the plurality of external sensors of the motor vehicle with the three-dimensional model of the real-world area adjacent the motor vehicle.

14. The method of claim 13, further comprising the steps of defining a remote focus region in the 3-D model by the vehicle application routine, wherein the remote focus region corresponds to a portion of the real-world area beyond the effective sensor ranges of the plurality of external sensors of the motor vehicle.

15. The method of claim 14, further comprising the step of receiving V2X signals that contains information in the remote focus region.

16. A system, comprising:

a plurality of external sensors configured to collect information on an adjacent area surrounding a host vehicle;

a perception controller configured to process the collected sensor information to generate a perception scene graph (PSG) comprising a three-dimensional model of a real-world area adjacent the vehicle, wherein the perception controller includes a sensor priority manager; and a state decision logic (SDL) controller configured to subscribe to the PSG and extracting information from the 3-D model to execute a vehicle application routine, wherein the vehicle application routine includes a subroutine to define a focus region;

wherein the priority manager identifies sensors that have an effective sensor range that partially overlaps the focus region and increases processing power to the identified sensors.

17. The system of claim 16, wherein the perception controller is configured to fuse the effective sensor ranges to generate a high fidelity 3-D model of the focus region.

18. The system of claim 17, wherein the perception controller is configured to reduce processing power to the plurality of sensor that are not identified to cover the focus region.

19. The system of claim 18, further comprising a V2X receiver configured to receive information containing a 3-D model of a real-world beyond the sensor readings.

20. The system of claim 19, wherein the SDL controller is configured to publish a copy of the PSG comprising a high fidelity 3-D model of the focus region.

* * * * *